(12) United States Patent
Megiddo

(10) Patent No.: US 6,665,649 B1
(45) Date of Patent: Dec. 16, 2003

(54) SMOOTH END OF AUCTION ON THE INTERNET

(75) Inventor: Nimrod Megiddo, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/523,100

(22) Filed: Mar. 10, 2000

(51) Int. Cl.$^7$ .............................................. G06F 17/60
(52) U.S. Cl. ...................................................... 705/37
(58) Field of Search ........................................... 705/37

(56) References Cited

U.S. PATENT DOCUMENTS

| | | | |
|---|---|---|---|
| 5,835,896 A | 11/1998 | Fisher et al. ................. | 705/37 |
| 5,966,699 A | 10/1999 | Zandi ........................... | 705/38 |
| 6,199,050 B1 * | 3/2001 | Alaia ............................ | 705/37 |
| 6,216,114 B1 * | 4/2001 | Alaia ............................ | 705/37 |
| 6,223,167 B1 * | 4/2001 | Alaia ............................ | 705/37 |
| 6,230,146 B1 * | 5/2001 | Alaia ............................ | 705/37 |
| 6,230,147 B1 * | 5/2001 | Alaia ............................ | 705/37 |

* cited by examiner

*Primary Examiner*—Geoffrey R. Akers
(74) *Attorney, Agent, or Firm*—Lacasse & Associates, LLC; Randy W. Lacasse; Marc D. McSwain

(57) ABSTRACT

The present invention provides a smooth ending system for an auction on the Internet. The system randomly selects an end time for the auction by picking an auction duration from a probability distribution, so that bidders have no preferences over the time of bidding. At any given time, assuming that the auction is still in process, there is a fixed probability, independent of the time that has elapsed since the beginning of the auction, that the auction will end within the next time unit.

15 Claims, 4 Drawing Sheets

SMOOTH END OF AUCTION ON THE INTERNET

BACKGROUND OF THE INVENTION

1. Field of Invention

The present invention relates generally to the field of conducting on-line auctions over a computer or communication network, such as the Internet. More particularly, the present invention relates to a system for randomly varying the time period of an auction on the Internet.

2. Discussion of Prior Art

Traditionally, auctions have provided a desirable and exciting marketplace for the buying and selling of products. Typically with auctions, there is the possibility of an individual participating in the auction obtaining a product at a very competitive price. At the same time, the seller always has the possibility of obtaining higher than expected value. Since the auction entails multiple people bidding for a product, the goal of the seller and auctioneer is to increase the probability of obtaining the highest possible bid.

Drawbacks to auctions, however, include restrictions on participation based on an individual being required to attend the auction in person and actively place a bid on a product of interest. Secondly, participants are required to have enough funds at the time they attend the auction. These restrictions may hold down the final price of an item for sale.

Recent innovations such as high speed computers, e-mail and the Internet have made it possible to conduct on-line auctions where individual bidders place their bids in real-time from a remote computer location via the Internet before or during a bidding section. Details of products to be auctioned are posted on an auction site computer and are available to bidders and sellers via the Internet. Several on-line auctions such as Housing Urban Development (HUD®), Ebay® and On-sale® allow bidders to register and submit bids through the Internet. Items for sale and bid information are displayed on the bidders remotely located terminals. Bid information may include a description of items for auction, last bid, date auction ends, date auction started, sellers information, current number of bids, etc. Typically the auction runs for a period of several days or weeks before allocating the item for auction to the highest bidder.

Most auctions are announced with an exact end of auction time. Sealed bid auctions typically have a firm deadline so that the winner(s) is (are) selected from bids that were received before the predetermined deadline. In other auctions, the bidding goes on until a known end time and the winner(s) is (are) determined according to pre-fixed rules. While in traditional auctions the predetermined end time may not present any particular problem, on the Internet this feature introduces undesirable side effects. Firstly, due to very heavy traffic close to the end of an auction with multiple terms, bidders may not be able to access the current bid amount, and may not be able to revise their bids accordingly. Secondly, bidders sometimes wait until the last moment and then enter a bid that is sufficient for winning. Bidders prefer to wait, fearing that competitors may raise the bid amount even higher or sometimes they forget to return to, the auction. As a result, sellers often do not realize the optimum selling price for their items.

The prior art in this art area is exemplified by the following-patent which describes a system and method of conducting a multi-person interactive on-line auction which terminates the auction from further bidding and notifies the winning bidders and losers as to the auction outcome that is based on elapsed time since the start of the auction and bidding history of the auction.

U.S. Pat. No. 5,835,896, issued to Fisher at al., discloses a method and system for processing and transmitting electronic auction information. The system allows a group of bidders to interactively place bids over the computer or communication network. Based upon a predetermined time, a period of no bidding activity or when a desired sales volume is reached, the system closes the auction from further bidding and notifies the winning bidders or losers of the auction outcome. However, this patent makes no mention of the system selecting a random auction end time. The limitations identified above may result in a final price that is lower than what the seller could have obtained otherwise.

The present invention overcomes the drawbacks of the prior art by providing a method and system for selecting a random auction end-time. The system allows a seller to set a desired end-of-auction time, and based on such setting, the system generates a random end time for the auction by picking an auction duration from a probability distribution, so that bidders never have any preference over the time of bidding.

SUMMARY OF THE INVENTION

The present invention provides a smooth ending system for an auction on the Internet. Furthermore, the system randomly selects an end time for the auction by picking an auction duration from a probability distribution, so that bidders have no preferences over the time of bidding. At any given time, assuming that the auction is still in process, there is a fixed probability, independent of the time that has elapsed since the beginning of the auction, that the auction will end within the next time unit. Furthermore, the system prompts the seller to indicate or set a desired expected duration d of the auction. The system then proceeds to picking a pseudo random number r $0<r<m$ where $m>>1$. The system calculates D according to the formula $D=-d \ln(1-r/m)$. Auction begins at time t and finally the system determines end time of auction according to t+D.

DESCRIPTION OF THE PREFERRED EMBODIMENTS

Figure 1:
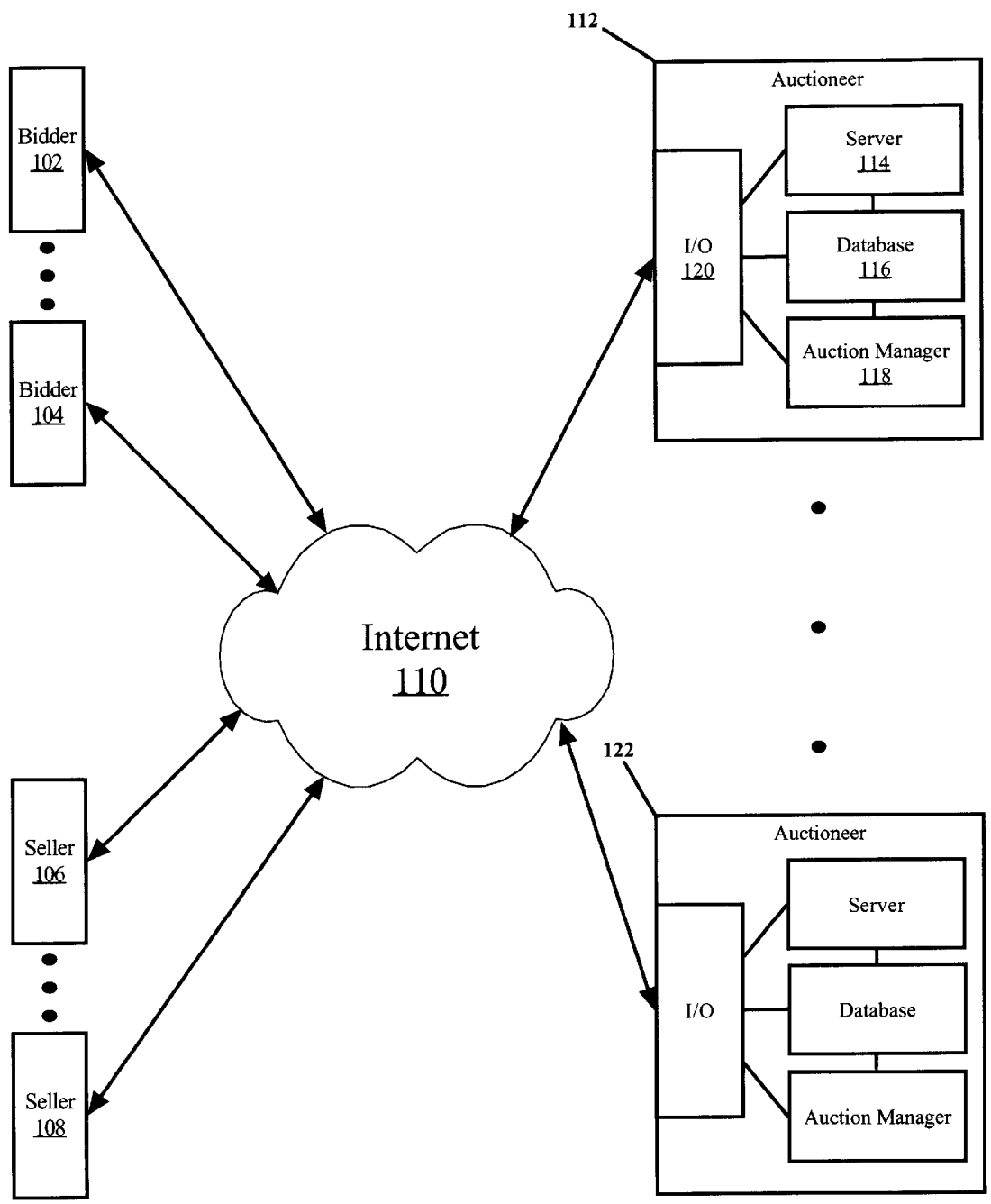
FIG. 1 illustrates the general environment for the auction system.

While this invention is illustrated and described in a preferred embodiment, the system may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

FIG. 1 illustrates the general environment for the present invention. An on-line auction system which allows a plurality of bidders 102–104 to access a plurality of auction sites 112–122 and participate in an auction during a bidding session from a remote location via communication lines. Similarly, a plurality of sellers 106–108 access auctioneer-sites 112, 122 over the a computer network such as the Internet 110. Auctioneer site 112 includes computer server 114 connected via communication lines to the remote terminals of both the bidders and the sellers. Continuing with auction site 112, is database 116 which contains and receives information such as items for bid, item description, item identification number, bid records, price ranges, sellers information, etc. Auction site 112 further includes auction manager 118 which run the auction. Running the auction includes, but is not limited to, the following functions: accepting bids, comparing bids, applying auction rules, determining seller identities, determining ends times, bid pooling etc. Included also in auction site 112 is input/output device 120 that handles all communication between bidders 102–104, sellers 106–108 and auctioneer site 112. An example of an Internet auctioning system is described below in FIGS. 2a–2b.

Figure 2A:
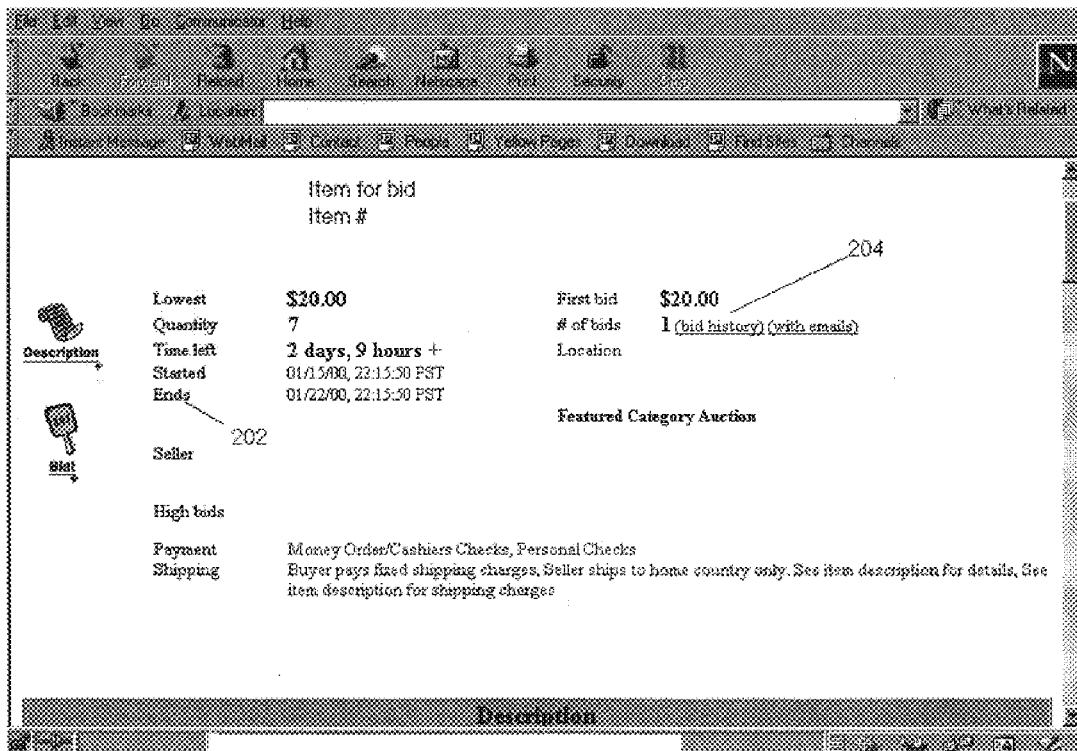
FIGS. 2a–2b are prints/screen shots of a typical on-line auction.
Figure 2B:
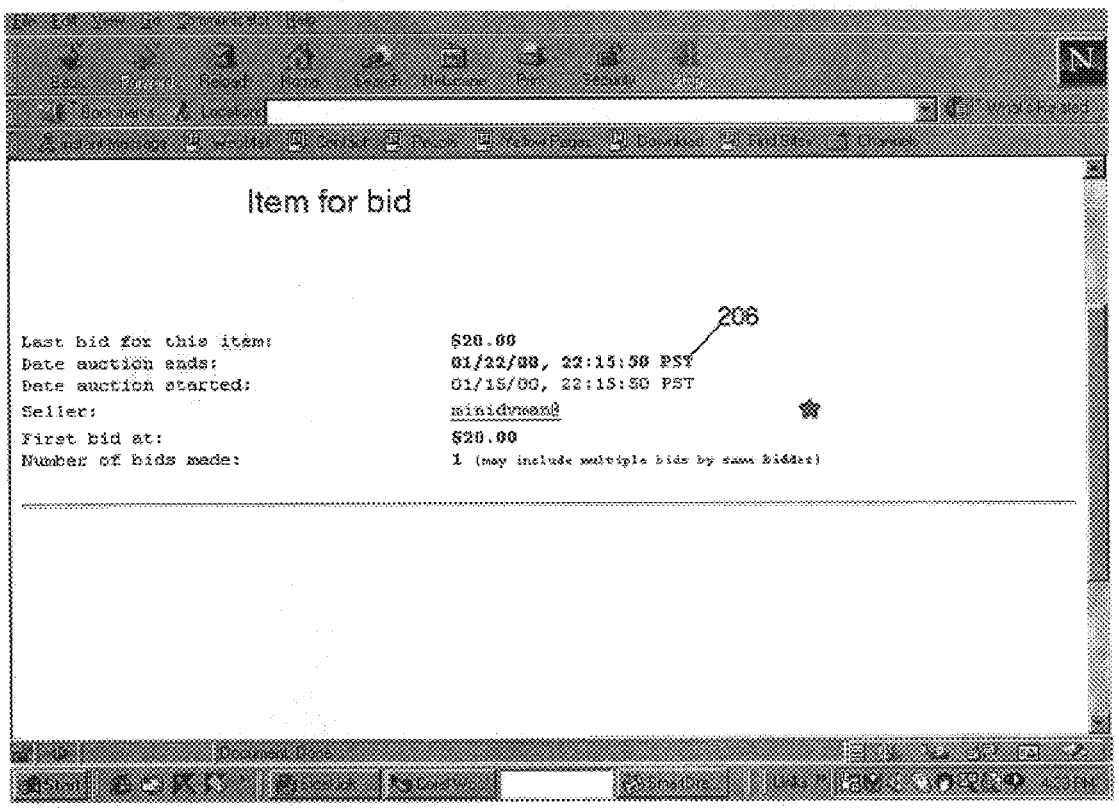

FIG. 2a shows a screen print of a typical on-line auctioning system. The screen print illustrates an auction system for auctioning an item for bid. Shown in this print is an announcement of the exact end time 202 of the auction. Other features that may be of interest are the lowest bid that will be accepted, first bid, number of bids, auction location, auction start time, predetermined end time and the remaining time left. Furthermore, FIG. 2a includes a hypertext link entitled bid history 204 and, upon clicking such link, the system takes a user to the print shown in FIG. 2b. FIG. 2b therefore, illustrates more detailed information pertinent to the bid history for the item for bid. The screen print in FIG. 2b shows the date and time the auction ends 206 as "01/22/00,22:17:09 PST" indicating to the bidder the remaining left time that may therefore encourage the bidder to wait until the last moment before entering a bid that is sufficient for winning.

Figure 3:
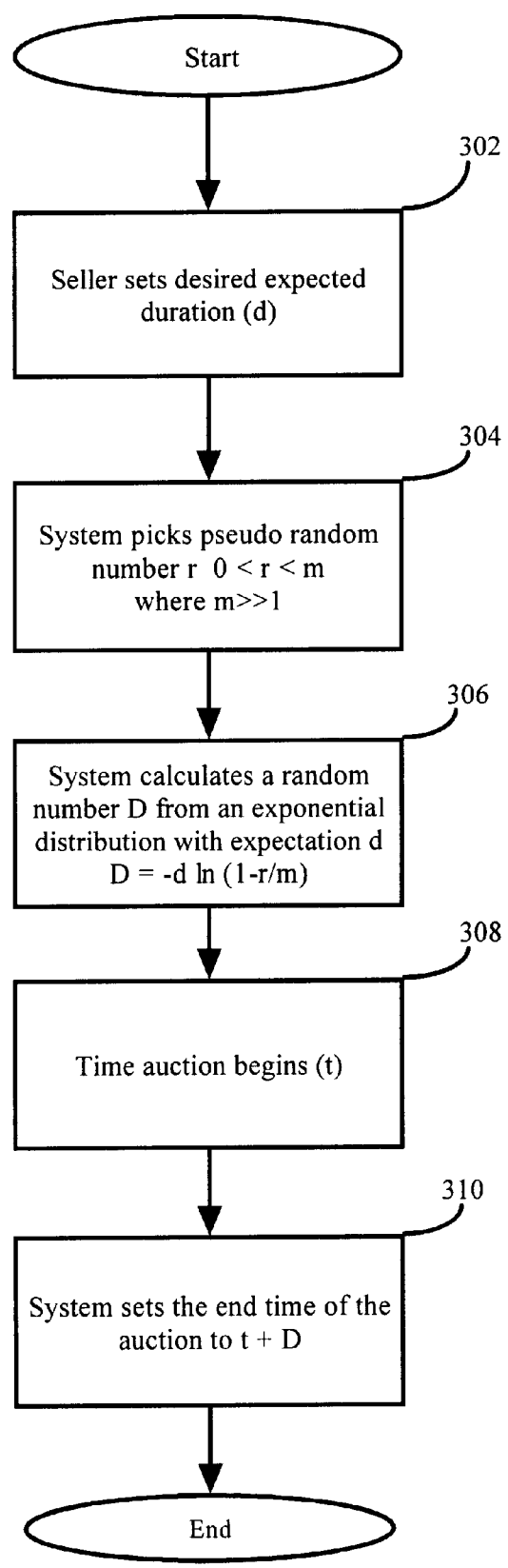
FIG. 3 illustrates a flow chart depicting steps for randomly selecting an auction end-time.

Referring to FIG. 3, a flow diagram illustrates steps of the present invention for randomly selecting an end time for an auction on the Internet. According to this system, sellers have the option of setting an end-of-auction time at random by letting the system pick for them an auction duration from a probability distribution so that bidders never have any preferences over the time of bidding. The system indicates to a seller, who will like to use such an option, to set desired expected duration d in step 302 of the auction. The system then picks a pseudo-random number r in step 304 where $0<r<m$ and $m>>1$. In step 306, the system picks a random number D from an exponential distribution with expectation d indicated by the seller in step 302, where D is calculated according to the formula $D=-d \ln(1-r/m)$. A selected auction begins at time t as in step 308 and the system sets the end time of the auction to t+D. Given the auction has not ended, the end-time of the auction can be determined or re-determined during the auction, and participants do not get any further knowledge about the likelihood of it ending within the next time unit.

The end of the auction time is kept secret from the bidders. Revealing the start of auction time t to the bidders does not give the participants any more information about the actual end of the auction time. By revealing the expected duration d, the seller indicates to the participants how likely it is for the auction to end soon.

An alternative embodiment is to restart the auction automatically with a new D in case the number of bids received by the previous end-of-auction time does not exceed a predetermined minimum. The minimum can be left for the seller to choose, but I do not see why we need to limit the scope of the invention in this way. The system therefore, allows the seller to post a relatively small d, so that the interested bidders are urged to act quickly, but the seller reserves the right to reinstate the auction if the number of bids received is below the predetermined value.

The above desired steps of selecting a random time period for an auction and its described functional elements are implemented in various computing environments. For example, the present invention may be implemented on a conventional IBM PC or equivalent, multi-nodal system (e.g. LAN) or networking system (e.g. Internet, WWW). All programming, and data related thereto are stored in computer memory, static or dynamic, and may be retrieved by the user in any of: conventional computer storage, display (i.e. CRT) and/or hardcopy (i.e. printed) formats. The programming of the present invention may be implemented by one of ordinary skills in computer programming.

CONCLUSION

A system and method has been shown in the above embodiments for the effective implementation of randomly selecting an end time for auction on the Internet. While various preferred embodiments have been shown and described, it will be understood that there is no intent to limit the invention by such disclosure, but rather, it is intended to cover all modifications and alternate constructions falling within the spirit and scope of the invention and as further defined in the appended claims. For example, the present invention should not be limited by software/program, computing environment or any specific computing hardware.

What is claimed is:

1. A method for randomly varying the time period of an on-line auction, said on-line auction performed on a system comprising one or more remote computers, at least one remote seller, an auctioneer site and a communication network connecting said remote computers and said at least one remote seller to said auctioneer site, said method comprising the following steps:

receiving information associated with a prospective auction;

receiving a desired expected duration, d, associated with said prospective auction;

calculating a random auction duration D, based upon said received expected duration d;

setting an actual duration of said prospective auction to said calculated D, receiving one or more bids from said one or more remote computers during said random auction duration period, and wherein said one or more bids are received without disclosing said actual duration period D.

2. A method for randomly varying the time period of an on-line auction, as per claim 1, wherein said desired expected auction duration d, is received from said at least one seller.

3. A method for randomly varying the time period of an on-line auction, as per claim 1, wherein said calculated random auction duration, D, is calculated according to the formula $D=-d \ln(1-r/m)$, wherein $0<r<m$ and $m>>1$.

4. A method for randomly varying the time period of an on-line auction, as per claim 1, wherein said received expected time, d, is received before said auction begins.

5. A method for randomly varying the time period of an online auction, as per claim 1, wherein if the number of bids received by said end of auction time, t+D, does not exceed a predetermined minimum, said method further comprising the steps of:

calculating a new random auction duration D' based upon a number picked at random from an exponential distribution; and extending said auction after time=t+D by amount equal to D'.

6. A method for randomly varying the time period of an online auction, as per claim 1, wherein said on-line auction may be implemented locally or remotely on one or more computer-based systems, across networks or existing communication mediums.

7. A method for randomly varying the time period of an online auction, as per claim 6, wherein said communication network comprises any of the LANs, WANs, Internet or Web-based networks.

8. A method for automatically selecting a random end-time for an on-line auction, said method comprising the following steps:

receiving d, said d corresponding to a desired expected duration of said on-line auction;

selecting random number, r, from an exponential distribution, wherein $0<r<m$ and $m>>1$;

calculating a random auction duration, D, according to $$D=-d \ln (1-r/m), \text{ and}$$

setting duration associated with said auction to D;

whereby, said on-line auction ends without revealing said duration of said auction.

9. A method for automatically selecting a random end-time for an auction, as per claim 8, wherein said d is received before said auction begins.

10. A system for selecting an auction end-time randomly comprising:

an auctioneer site which receives item information from at least one seller and bidding information from at least one bidder;

a computer server connected via communication lines to said at least one bidder and said at least one seller;

a database which receives and stores information pertaining to said auction;

an auction manager which manages said auction;

a receiver which accepts a proposed expected duration, d;

a calculator which computes a random auction duration, D, based on said proposed duration, d, and a number, r, picked at random from an exponential distribution; and a timer which begins said auction at time to for a duration equal to said random auction duration, D.

11. A system for selecting an auction end-time randomly, as per claim 10, wherein said random auction duration, D, is calculated according to the formula $D=-d \ln (1-r/m)$, wherein $0<r<m$ and $m>>1$.

12. A system for selecting an auction end-time randomly, as per claim 10, wherein said system may be implemented locally or remotely on one or more computer-based systems, across networks or existing communication mediums.

13. A system for selecting an auction end-time randomly, as per claim 12, wherein said networks comprises any of the following: LANs, WANs, Internet or Web-based networks.

14. An article of manufacture comprising a computer product implementing a process for randomly selecting an end-time for an auction across networks comprising programmable code implementing:

receiving expected duration, d;

picking pseudo random number, r, from an exponential distribution, wherein $0<r<m$ and $m>>1$;

calculating a random auction duration, D, from an exponential distribution with an expectation equal to said received expected duration, d, and m setting duration associated with said auction to D;

wherein said auction starts at time=t and said auction ends at time=t+D.

15. An article of manufacture comprising a computer product implementing a process for randomly selecting an end-time for an auction across networks, as per claim 14, wherein $D=-d \ln (1-r/m)$.

\* \* \* \* \*

UNITED STATES PATENT AND TRADEMARK OFFICE
CERTIFICATE OF CORRECTION

PATENT NO. : 6,665,649 B1 Page 1 of 1
DATED : December 16, 2003
INVENTOR(S) : Nimrod Megiddo It is certified that error appears in the above-identified patent and that said Letters Patent is hereby corrected as shown below:

<u>Column 6,</u>
Line 10, delete "a timer which begins said auction at time to for a duration" and insert therefore, -- a timer which begins said auction at time $t_0$ for a duration --
Line 34, delete "m setting duration associated with said auction to D;" and insert therefor, -- setting duration associated with said auction to D; --

Signed and Sealed this

Eighth Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,665,649 B1
DATED : December 16, 2003
INVENTOR(S) : Nimrod Megiddo It is certified that error appears in the above-identified patent and that said Letters Patent is hereby corrected as shown below:

Column 4,
Lines 1-3, delete "The minimum can be left for the seller to chose, but I do not see why we need to limit the scope of the invention this way." and insert therefore, -- In one scenario, the seller can set the predetermined minimum value. Such variations regarding how the minimum value is set should not be used to limit the scope of the present invention. --

Signed and Sealed this

Twenty-sixth Day of July, 2005

JON W. DUDAS
*Director of the United States Patent and Trademark Office*

UNITED STATES PATENT AND TRADEMARK OFFICE
CERTIFICATE OF CORRECTION

PATENT NO. : 6,665,649 B1
DATED : December 16, 2003
INVENTOR(S) : Nimrod Megiddo It is certified that error appears in the above-identified patent and that said Letters Patent is hereby corrected as shown below:

<u>Column 4,</u>
Line 1, replace the first full sentence with the following:
-- The minimum can be left for the seller to choose. --.

Signed and Sealed this

Twenty-second Day of November, 2005

JON W. DUDAS
*Director of the United States Patent and Trademark Office*

UNITED STATES PATENT AND TRADEMARK OFFICE
CERTIFICATE OF CORRECTION

PATENT NO. : 6,665,649 B1
DATED : December 16, 2003
INVENTOR(S) : Nimrod Megiddo It is certified that error appears in the above-identified patent and that said Letters Patent is hereby corrected as shown below:

<u>Column 4,</u>
Lines 1-3, delete "The minimum can be left for the seller to chose, but I do not see why we need to limit the scope of the invention this way." and insert therefore, -- In one scenario, the seller can set the predetermined minimum value. Such variations regarding how the minimum value is set should not be used to limit the scope of the present invention. --.

This certificate supersedes Certificate of Correction issued July 26, 2005.

Signed and Sealed this

Thirty-first Day of January, 2006

JON W. DUDAS
*Director of the United States Patent and Trademark Office*

UNITED STATES PATENT AND TRADEMARK OFFICE
CERTIFICATE OF CORRECTION

PATENT NO. : 6,665,649 B1  
APPLICATION NO. : 09/523100  
DATED : December 16, 2003  
INVENTOR(S) : Nimrod Megiddo Page 1 of 1

It is certified that error appears in the above-identified patent and that said Letters Patent is hereby corrected as shown below:

<u>Column 4,</u>
Lines 1-3, delete "The minimum can be left for the seller to choose, but I do not see why we need to limit the scope of the invention this way." and insert therefore, -- In one scenario, the seller can set the predetermined minimum value. Such variations regarding how the minimum value is set should be used to limit the scope of the present invention. --.

This certificate supersedes Certificate of Correction issued July 26, 2005, November 22, 2005 and January 31, 2006.

Signed and Sealed this

Fourth Day of July, 2006

JON W. DUDAS  
*Director of the United States Patent and Trademark Office*